United States Patent [19]
Bennett

[11] 3,809,427
[45] May 7, 1974

[54] VEHICLE BODY MOUNT

[75] Inventor: John E. Bennett, Sterling Heights, Mich.

[73] Assignee: Bennett Equipment Corporation, Detroit, Mich.

[22] Filed: Oct. 3, 1972

[21] Appl. No.: 294,538

[52] U.S. Cl............. 296/35 R, 29/512, 248/358 R, 267/63 R
[51] Int. Cl.......................................... B62d 27/04
[58] Field of Search...... 296/35 R; 267/63 R; 248/9, 248/15, 358 R; 287/20.3; 29/512, 522, 523

[56] References Cited
UNITED STATES PATENTS

| | | | |
|---|---|---|---|
| 3,622,194 | 11/1971 | Bryk | 296/35 R |
| 611,802 | 10/1898 | Taylor | 29/512 X |
| 2,976,080 | 3/1961 | Moore | 296/35 R |
| 1,656,856 | 1/1928 | Gagnon | 287/20.3 X |
| 3,218,101 | 11/1965 | Adams | 296/35 R |
| 3,266,139 | 8/1966 | Adams | 248/358 R X |
| 2,089,790 | 8/1937 | Halpern | 29/523 X |
| 2,957,196 | 10/1960 | Kreider et al. | 29/522 X |
| 3,171,676 | 3/1965 | Horn | 29/523 X |

Primary Examiner—David Schonberg
Assistant Examiner—Leslie J. Paperner
Attorney, Agent, or Firm—Barnes, Kisselle, Raisch & Choate

[57] ABSTRACT

A body mount and a method of assembling the same comprising a first sheet metal part having a base and an integral tube extending from the base, a second sheet metal part having a base and an integral tube extending from said base, the tube of said first-mentioned part having a portion adjacent the free end thereof which is of reduced internal diameter thereby forming an intermediate connecting portion between the portion of greater diameter and the portion of lesser diameter which is positioned in spaced axial relationship to the free end of the tube of said first part. The second part has its tubular part telescopically received in the tube of said first part, the outer diameter of said tube of said second part being less than the inner diameter of the end portion of said first part. A pair of resilient blocks are provided through which the tubular parts extend. The free end of the tubular part of said second part is flared outwardly into engagement with the intermediate portion of said first part to hold said blocks of resilient material and a portion of the vehicle frame in locked position.

10 Claims, 3 Drawing Figures

PATENTED MAY 7 1974 3,809,427
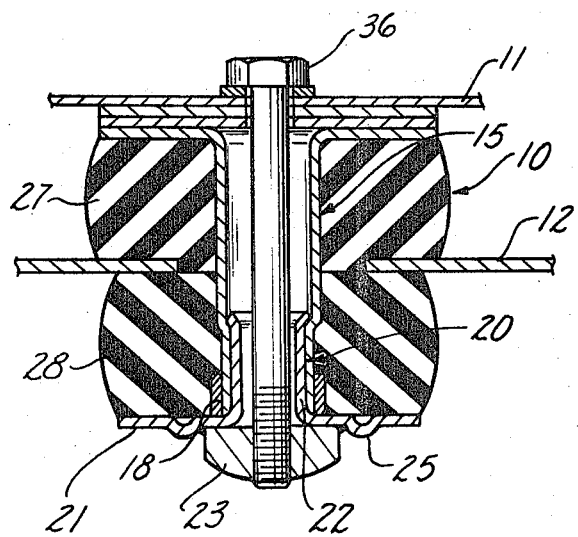
Fig-1
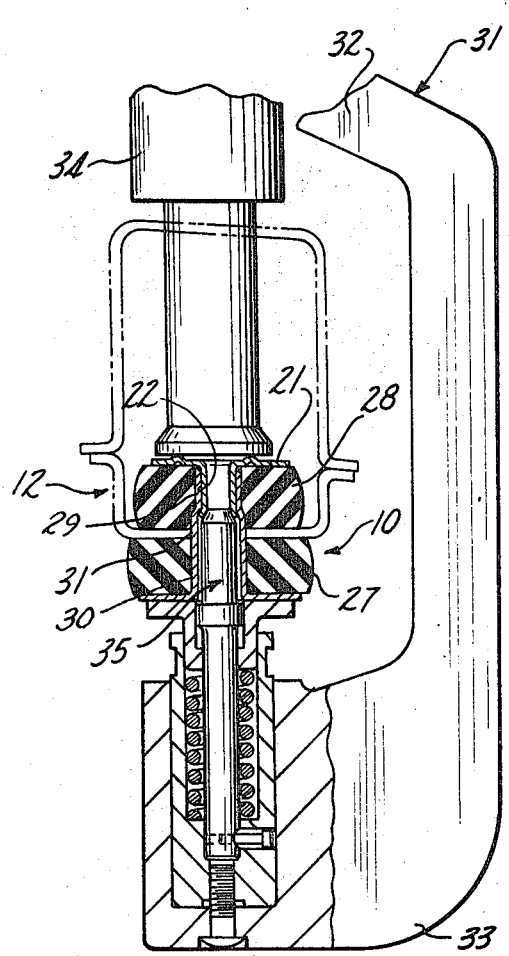
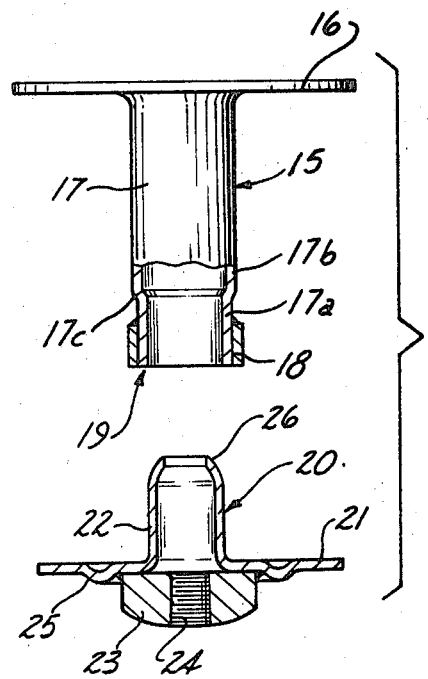
Fig-2
Fig-3

VEHICLE BODY MOUNT

This invention relates to body mounts utilized for mounting a body of a vehicle on a vehicle frame.

BACKGROUND OF THE INVENTION

It is common to resiliently mount a vehicle body on a vehicle frame by the utilization of a body mount that comprises a pair of resilient blocks which are positioned on opposite sides of the opening of a vehicle frame and are held therein by telescoping sheet metal parts, one of which carries a thread so that a bolt can then be passed through an opening in the vehicle body and threaded into the body mount to support the vehicle body on the vehicle frame.

Among the objects of the invention are to provide an improved body mount that has high strength, is easy to assemble, and will withstand the normal vibrations and shock occurring in travel of the vehicle over various terrains.

SUMMARY OF THE INVENTION

The invention comprises a body mount and a method of assembling the same. A first sheet metal part has a base and an integral tube extending from the base. A second sheet metal part has a base and an integral tube extending from said base. The tube of said first-mentioned part has a portion adjacent the free end thereof which is of reduced internal diameter thereby forming an intermediate connecting portion between the portion of greater diameter and the portion of lesser diameter which is positioned in spaced axial relationship to the free end of the tube of said first part. The second part has its tubular part telescopically received in the tube of said first part, the outer diameter of said tube of said second part being less than the inner diameter of the end portion of said first part. A pair of resilient blocks are provided through which the tubular parts extend. The free end of the tubular part of said second part is flared outwardly into engagement with the intermediate portion of said first part to hold said blocks of resilient material and a portion of the vehicle frame in locked position.

DESCRIPTION OF THE DRAWINGS

FIG. 1 is a vertical sectional view through a joint embodying the invention.

FIG. 2 is an exploded view showing two of the parts.

FIG. 3 is a fragmentary vertical sectional view through an apparatus for assembling the body mount.

DESCRIPTION

Referring to FIGS. 1 and 2, the body mount 10 made in accordance with the invention is adapted to be used for supporting a portion of a vehicle body 11 on a vehicle frame 12. The vehicle body conventionally would utilize a plurality of body mounts at spaced points to support the entire body on the vehicle frame. The body mount 10 comprises a first sheet metal part 15 having a base or flange 16 and an integral tubular portion 17. The tubular portion 17 has a portion 17a adjacent its free end which has a lesser internal diameter than the remaining portion 17b thereby defining a tapered transitional area 17c. A steel ring 18 is welded to the free end of the tubes 17 and the inner edge is tapered inwardly as at 19.

The body mount 10 further includes a second sheet metal part 20 which has a flange 21 and a tube 22 integral therewith. A weld nut 23 is welded to the outer surface of the flange 21 and has threads 24 axially aligned with the axis of the part 20. The flange 21 further includes an annular bead 25. The outer edge of the free end 26 of the tube 22 is tapered inwardly. The outer diameter of the tube 22 is slightly less than the inner diameter of the tubular portion 17a. The body mount further includes rubber blocks 27, 28.

In order to apply the body mount to the vehicle frame, the blocks 27, 28 are positioned so that their openings 29, 30 are in alignment on opposite sides of the opening 31 in the vehicle frame, the metal parts are brought into position so that the tubes 17, 22 extend through the openings 29, 30 and are telescoped with respect to one another. A staking gun 31 having jaws 32, 33 is brought into position to compress the rubber blocks by application of a force through a cylinder 34 and a staking tool 35 is then operated to flare the end of the tube part outwardly against the transitional area.

The vehicle body can then be brought into position so that the portion thereof with the opening is aligned with the openings in the tubes 17, 22 and a bolt 36 inserted therein and threaded into the nut to hold the body resiliently on the vehicle frame, the vehicle body engaging the upper surface of the block.

I claim:

1. In a vehicle body mount, the combination comprising
    a first sheet metal part having a base and an integral tube extending from the base,
    a second sheet metal part having a base and an integral tube extending from said base,
    the tube of said first-mentioned part having a portion adjacent the free end thereof which is of reduced internal diameter thereby forming an intermediate connecting portion between the portion of greater diameter and the portion of lesser diameter which is positioned in spaced axial relationship to the free end of the tube of said first part,
    said second part having its tubular part telescopically received in the tube of said first part,
    the outer diameter of said tube of said second part being less than the inner diameter of the end portion of said first part,
    a pair of resilient blocks through which the tubular parts extend,
    the free end of the tubular part of said second part being flared outwardly into engagement with the intermediate portion of said first part to hold said blocks of resilient material and a portion of the vehicle frame in locked position,
    and a ring of metal about the periphery of the free end of the tube of said first part.

2. The combination set forth in claim 1 including means defining a thread on said second part axially aligned with the axis of the tube thereof.

3. The combination set forth in claim 2 wherein said thread defining means comprises a nut welded to the flange of said second part.

4. In a vehicle body mount, the combination comprising
    a first sheet metal part having a base and an integral tube extending from the base, a second sheet metal part having a base and an integral tube extending from said base, the tube of said first-mentioned part having a portion adjacent the free end thereof which is of reduced internal diameter thereby forming an intermediate connecting portion between the portion of greater diameter and the portion of lesser diameter which is positioned in spaced axial relationship to the free end of the tube of said first part, said second part having its tubular part telescopically received in the tube of said first part, the outer diameter of said tube of said second part being less than the inner diameter of the end portion of said first part, a pair of resilient blocks through which the tubular parts extend, the free end of the tubular part of said second part being flared outwardly into engagement with the intermediate portion of said first part to hold said blocks of resilient material and a portion of the vehicle frame in locked position, and a fastener extending through a portion of a vehicle body and connected to said parts, and a ring of metal about the periphery of the free end of the tube of said first part.

5. The combination set forth in claim 4 including means defining a thread on said second part axially aligned with the axis of the tube thereof into which said fastener extends.

6. The combination set forth in claim 5 wherein said thread defining means comprises a nut welded to the flange of said second part.

7. For use in a vehicle body mount which includes a pair of resilient blocks, the combination comprising a first sheet metal part having a base and an integral tube extending from the base, a second sheet metal part having a base and an integral tube extending from said base, the tube of said first-mentioned part having a portion adjacent the free end thereof which is of reduced internal diameter thereby forming an intermediate connecting portion between the portion of greater diameter and the portion of lesser diameter which is positioned in spaced axial relationship to the free end of the tube of said first part, said second part having its tubular part telescopically received in the tube of said first part, the outer diameter of said tube of said second part being less than the inner diameter of the end portion of said first part, the free end of the tubular part of said second part being adapted to be flared outwardly into engagement with the intermediate portion of said first part to hold said resilient blocks of resilient material and a portion of the vehicle frame in locked position, and a ring of metal about the periphery of the free end of the tube of said first part.

8. The combination set forth in claim 7 wherein the free end of the tube of said second part has an outer surface tapered inwardly.

9. The combination set forth in claim 7 including means defining a thread on said second part axially aligned with the axis of the tube thereof.

10. The combination set forth in claim 9 wherein said thread defining means comprises a nut welded to the flange of said second part.

* * * * *